(12) United States Patent  (10) Patent No.: US 8,302,801 B2
Fried  (45) Date of Patent: Nov. 6, 2012

(54) TELESCOPING EGG CONTAINER

(76) Inventor: Brian A. Fried, Melville, NY (US)

( * ) Notice: Subject to any disclaimer, the term of this patent is extended or adjusted under 35 U.S.C. 154(b) by 1237 days.

(21) Appl. No.: 12/046,428

(22) Filed: Mar. 11, 2008

(65) Prior Publication Data

US 2008/0237229 A1 Oct. 2, 2008

Related U.S. Application Data

(60) Provisional application No. 60/909,296, filed on Mar. 30, 2007.

(51) Int. Cl.
  *B65D 1/24* (2006.01)
  *B65D 6/00* (2006.01)
  *B65D 21/02* (2006.01)
(52) U.S. Cl. .............. 220/508; 220/8; 220/23.2
(58) Field of Classification Search .............. 220/8, 508, 220/23.2, 23.4, 23.6, 23, 23.8, 4.03, 503, 220/50, 531, 6; 206/518, 521; 217/27; 99/440; 211/14; 108/93
See application file for complete search history.

(56) References Cited

U.S. PATENT DOCUMENTS

| | | | |
|---|---|---|---|
| 1,143,197 A * | 6/1915 | Hubbard | 220/8 |
| 1,991,445 A * | 2/1935 | Brostrom | 451/455 |
| 1,997,220 A * | 4/1935 | Killgore | 211/14 |
| 2,138,418 A * | 11/1938 | Fahrne | 211/14 |
| 2,188,044 A | 1/1940 | Hickman | |
| 2,402,883 A * | 6/1946 | Gavalis | 99/440 |
| 2,438,443 A | 3/1948 | Jermyn | |
| 2,683,953 A * | 7/1954 | Hopkins | 43/131 |
| D210,613 S | 3/1968 | Moore | |
| 3,407,424 A | 10/1968 | Lanzarone | |
| 3,691,671 A * | 9/1972 | Kroll | 446/476 |
| 3,842,563 A | 10/1974 | Rasmussen | |
| 3,958,711 A | 5/1976 | Morris | |
| 4,245,770 A | 1/1981 | Donaldson | |
| 4,266,668 A | 5/1981 | Paek | |
| 4,936,193 A * | 6/1990 | Stoll | 92/51 |
| 5,102,034 A | 4/1992 | Arnabili | |
| 5,360,111 A | 11/1994 | Arispe | |
| D382,710 S | 8/1997 | Henderson | |
| 6,012,583 A | 1/2000 | Ramirez | |
| 6,168,073 B1 | 1/2001 | Towle | |
| 6,213,672 B1 | 4/2001 | Varga | |
| 7,331,077 B1 | 2/2008 | Henry | |

* cited by examiner

*Primary Examiner* — Bryon Gehman
*Assistant Examiner* — Shawn Braden
(74) *Attorney, Agent, or Firm* — Lane Patents LLC

(57) ABSTRACT

A telescoping egg container is disclosed comprising a plurality of slidable egg holder units that can nest one within another, such that the telescoping egg container can be extended or collapsed to accommodate various numbers of eggs to be stored.

9 Claims, 8 Drawing Sheets

TELESCOPING EGG CONTAINER

CLAIM TO PRIORITY

This application claims priority to U.S. Patent Appl. Ser. No. 60/909,296, "Collapsing Egg Dispenser," filed Mar. 30, 2007, hereby incorporated by reference in its entirety for all purposes.

BACKGROUND

1. Field of the Invention

This invention pertains to egg containers, particularly containers for use in refrigerators or other cooled spaces.

2. Description of Related Art

Many containers for eggs have been proposed, including the ubiquitous foam-based and paperboard egg cartons, plastic egg holders in refrigerator units, and a variety of rigid egg trays. Examples include those described in U.S. Pat. No. 2,188,044, "Egg Tray," issued to R. N. Hickman, Jan. 23, 1940; U.S. Pat. No. 2,438,443, "Egg Tray for Refrigerators," issued to A. C. Jermyn Mar. 23, 1948; and U.S. Pat. No. 5,102,034, "Egg Container," issued to A. Arnabili, Apr. 7, 1992, and D210,613, issued Aug. 14, 1967 to R. G. Moore.

In spite of the many products offered, there remains an unmet need for storage containers that can make efficient use of space, particularly in refrigerators where users frequently struggle to find adequate space to store and organize various items. An important insight regarding space utilization in a refrigerator is that user needs relative to storage space allocation among different product categories vary radically between users, and can vary from week to week for a given user. A problem with many egg cartons, built-in egg containers in refrigerators or other containers such as egg trays is that they occupy a fixed volume of space in the refrigerator (excluding the volume of the eggs themselves for uncovered containers), regardless of how many eggs the user wishes to store, thus frequently occupying more space than needed and leaving valuable space unavailable for other goods.

In the past, those skilled in the art have naturally focused on problems such as how to make egg trays more economical, more attractive, etc., generally designing durable or disposable containers with fixed dimensions. It appears that insights about the varying needs of consumers relative to egg storage have not been sufficiently appreciated, and thus those skilled in the art may not have seriously considered what we believe to be novel problem statement: how to provide an egg container that can be readily adjusted such that its occupied volume and/or occupied footprint (plan view surface area) in a refrigerator or elsewhere can vary depending on the number of eggs a user wishes to store. The framing of this new problem statement, based on insights about unmet consumer needs and the abandonment of previously accepted assumptions and constraints, is at the heart of at least some embodiments of the present invention, hereafter described. In other words, in one sense, in considering the merits of the invention hereafter described relative to the prior art, it should be understood that at least some aspects of the present invention represent more than merely finding solutions to the novel problem statements addressed here. Indeed, the recognition and discovery of the unmet need of variable volume or variable footprint egg containers should be understood as a significant inventive contribution associated with other aspects of the invention as claimed herein. The insight behind the mechanical invention can also be considered in terms of recognizing a previously unappreciated opportunity for user customization of egg storage space, such that the space occupied can readily be customized to provide a configuration that meets the varying needs of a user. With these insights now highlighted, the significance of the invention hereafter described may be better understood.

SUMMARY

With the recognition of a previously unappreciated consumer need regarding improved space utilization and/or user customization for egg storage, a subsequent discovery was made that a telescoping arrangement of cooperating egg holder units could be assembled to provide an egg container that can be readily adjusted to provide enhanced egg storage functionality for a user. The telescoping egg container of the present invention can occupy a small volume when a small number of eggs are being held, but can be extended as desired to allow a greater number of eggs to be held.

The telescoping egg containers of the present invention can be adapted to sit on a smooth surface such as a glass or plastic shelf in a refrigerator, but can also be supported by a substantially open surface such as a wire mesh or collection of rods and other support structures defining a shelf, or can be adapted to hang from a support structure in a refrigerator, cooler, or other surface. The telescoping egg container can hang from a support such as a top surface inside a refrigerator, or project from a wall mount such as a back splash fixture that can be adhesively or mechanically joined to a wall in a refrigerator or attached to another suitable surface, or attached or support through the use of brackets, hang wires, etc. One or more telescoping support devices may be present such as a rod or telescoping panel to provide a support on which the telescoping egg container may rest, or such support means may be attached directly to the telescoping egg container. Alternatively, components in the telescoping egg container may be attached to a track or rail that provides support, with the track or rail being above, below, or to the sides of the egg container, as desired. Any suitable support systems can be used. For simplicity, the examples described herein typically assume the presence of an underlying support surface such as a refrigerator shelf, but any known support system can be used without departing from the scope of the present invention.

In one embodiment, the telescoping egg container comprises a plurality of egg holder units having at least one dimension such as width, or at least two dimensions such as height and width, that vary among each of the plurality of egg holder units, such that they are able to nest one within another in a collapsed state. In one embodiment, both height and width vary such that the rearmost egg holder unit is both wider and taller than all of the other egg holder units, which become progressively narrower and shorter moving from the rear to the front units of the egg container.

In general, the egg container comprises a rear egg holder unit and one or more additional egg holder units capable of nesting within the rear egg holder unit. Each egg holder unit comprises a frame, that may comprise an upper surface and two side walls, with at least one recessed region descending from the upper surface capable of receiving an egg. The recessed region descends from an opening in the upper surface and comprises an egg retention member that prevents an egg from falling directly through the opening in the upper surface and can hold an egg or assist in holding an egg in place in the egg container. A given egg holder unit may be adapted to hold one or more eggs, such as two or more, three or more, and the like. The egg containers of the present invention may be adapted to hold any number of eggs when full, such as six, ten, twelve, fourteen, eighteen, twenty-four, thirty, and so forth, or such as six or more, twelve or more, eighteen or more, and the like. Eggs of any size may be considered, and need not be restricted to chicken eggs, but may also include eggs of many other species.

The recessed region in the egg holder unit is open toward the rear of the egg container such that the egg retention member of the egg holder unit can receive the egg retention member of an adjacent rearward egg holder unit (an egg holder unit generally having a greater width than the egg holder unit in question) when the egg container is in a collapsed state. A portion of the adjacent rearward egg holder unit can assist in holding the egg in place as it rests on the egg retention member, preventing it from falling or rolling off the egg retention member toward the rear of the egg container.

In the collapsed state, egg holder unit have been nested as much as possible without applying excessive force or without plastically deforming the egg holder units; in general, the collapsed state is reached when adjacent egg holder unit abut one against another and cannot readily slide further together.

Restraining means can prevent the various egg holder units from separating when the egg container is being extended and/or when a portion of the extended egg holder unit is lifted or subject to vertical force. The restraining means may include any suitable means for interlocking adjacent telescoping units and can include tongue and groove systems or other systems based on protruding members that engage with grooves or other depressions in an adjacent egg holder unit, as well as other means discussed hereafter.

The telescoping egg container can be extended from a compact, collapsed state to a fully extended state or any intermediate state therebetween by pulling on a forward egg holder unit, which may have a tab, a ring, a cord or other grasping means for conveniently grasping the egg holder unit to slide it or pull it forward along an axis of extension. As the foremost egg holder unit (i.e., the one that is in front when the egg container is extended) is moved forward, it eventually engages the adjacent rearward egg holder unit and begins to pull it forward as well as the forward motion of the foremost egg holder unit is continued, with restraining means preventing the separation of the two egg holder units and effectively holding them together during extension. Upon further extension, the rearward egg holder unit engages the next adjacent rearward egg holder unit and begins to pull it forward, and as forward motion continues, the successive egg holder units, from the front towards the rear, are moved forward in a telescoping motion until the egg container is fully extended.

Each egg holder unit has one or more open recessed regions that can receive an egg, when suitably extended, with the egg being held securely by the egg retention member of the respective egg holder unit and optionally assisted with the restraining effect of a portion of the adjacent rearward egg holder unit, which may comprise a concave region on the upper surface thereof adapted to engage the curved contour of an egg or other object. Other methods for extending and collapsing the container can be considered without departing from the scope of the present invention. For example, sliding or pushing may be applied to a rearward egg holder unit rather than pulling on a front egg holder unit, or intermediate units may be grasped and moved relative to one another, using the surfaces thereof which may include indentations or other structures for convenient grasping. Additional tools may be used to assist the extending or collapsing of the telescoping egg container, such as the use of springs, levers, cords, elastic bands, pulleys, motors, screws, guide tracks, etc., to regulate or control motion. The addition of such means to the telescoping egg container are considered within the scope of the present invention.

In many embodiments of the present invention, when the egg container is in a substantially collapsed state, each egg retention member participates in nesting relative to other egg retention members from adjacent egg holder units, either receiving an adjacent egg retention member or being received by an adjacent egg retention member or both (typical for egg retention members in an intermediate egg holder unit between the foremost and rearmost egg holder units, when applicable). However, in some embodiments, not all of the egg retention units participate in nesting. For example, a rearward egg holder unit may be adapted to hold a greater number of eggs than the adjacent forward egg holder unit, and thus may have a greater number of egg retention members than the adjacent forward egg holder unit, such that not all of its egg retention members are received by an adjacent forward egg retention member in a nesting relationship in the collapsed state. For example, the rearmost egg retention unit may be adapted to receive up to six eggs, with other egg holder units in the telescoping egg container having, for example, five, four, three, and two egg retention members.

Thus, in one embodiment, there is provided a telescoping egg container capable of being positioned in an extended state or in a collapsed state, comprising a rear egg holder unit, a forward egg holder unit, and one or more intermediate egg holder units, each egg holder unit comprising a frame having at least one recessed region with at least one egg retention member for receiving an egg when the telescoping egg container is in the extended state, the egg retention members of the at least one intermediate egg holder units and the forward egg holder unit having a rear-facing lateral opening to facilitate nesting of the egg holder units with each other when the telescoping egg container is in the collapsed state, wherein each of the rear egg holder unit and the intermediate egg holder units has a forward portion that, when the telescoping egg container is in the extended state, cooperates with at least one of the egg retention members of an adjacent egg holder unit such that an egg can be retained without risk of falling through the lateral openings.

In another aspect of the present invention, there is provided a telescoping egg container comprising a plurality of connected nestable egg holder units, the telescoping egg container having an axis of extension, and having a fully extended state corresponding to a first length along the axis of extension, and a fully collapsed state corresponding to a second length along the axis of extension, the second length being substantially less than the first length, with each egg holder unit comprising at least one recessed region capable of receiving at least one egg when the telescoping egg container is in the fully extended state.

In yet another aspect of the present invention, there is provided a telescoping egg container comprising a plurality of egg holder units, wherein the egg holder units each comprise a frame having an upper surface, at least one open recessed region in the upper surface, and at least one egg retention member within the at least one open recessed region, the egg retention member being attached to the frame, wherein the plurality of egg holder units can be nested together to define a collapsed state of the telescoping egg container, and wherein the plurality of egg holder units can be extended from the collapsed state along an axis of extension to an extended state, wherein the telescoping egg container in the extended state is capable of holding a larger number of eggs than in the collapsed state. The telescoping egg container may further comprise two substantially vertical side walls having a height, and wherein the height of the side walls of each egg holder unit differs from the height of the side walls of any adjacent egg holder unit, with the rear egg holder unit having the greatest height, such that when the telescoping egg container is resting on a flat supporting surface, each side wall of each egg holder unit can maintain contact with the flat supporting surface both in the extended state and in the collapsed state.

The components of the egg container of the present invention may be fashioned from any suitable material such as plastic, metal, fibrous materials such as paper, paperboard, wood, and the like, etc., or combinations thereof, including composites of any kind. Suitable plastic materials may include thermo plastic and thermosetting materials and plastic composites. Polymers to be considered include ABS (e.g., Terlux 2802 TR marketed by BASF, Ludwigshafen, Germany), MABS resins, polypropylene, polyethylene, polycarbonate, nylon, polyvinyl chloride, silicone polymers, and the like. Methods of manufacture for all or any part of the egg container may include injection molding, rapid prototype assembly methods of any kind (laser sintering, printing, UV curing of photosensitive resins, etc.), thermal welding, adhesive binding, ultrasonic bonding, etc. Components may be made from differing materials and assembled automatically or by hand. Individual components may be prepared from a sheet of material by die cutting, stamping, laser cutting, water jet cutting, etc.

The width of a first egg holder unit can substantially fill the interior space of the wider adjacent rearward egg holder unit, but the entire available space need not be filled. In such cases, restraining means to guide motion of the egg holder units need not involve interaction of the outer sides of the smaller egg holder unit with the inner sides of the larger egg holder unit, but may involve interaction on a track, or engagement with grooves, slots, or other means attached to the underside of the upper surface of the larger egg holder unit. A wide variety of geometries, restraining means, and so forth can be considered for the egg holder units in the telescoping egg container without departing from the scope of the present invention.

In the extended state of the telescoping egg container, a given egg holder unit can have a recessed region which, when viewed directly from above, has a horizontal open area providing line of site to any underlying surface. This open area can be due to the presence of the lateral opening in the egg retention member to facilitate nesting, but can also be due to other design aspects of the egg retention member such as additional open area toward the front rather than the rear of the egg container. The plan view projected surface area of the horizontal open area being can be 15% or more of the plan view projected surface area of the recessed region, or can be about 25% or more, about 40% or more, about 50% or more, or about 65% or more of the plan view projected surface area of the recessed region.

Business Model Considerations

The telescoping egg container can be sold to consumers for use in refrigerators, but other uses and business models can be considered. Telescoping egg containers according to the present invention can be used in industrial or business settings, such as in the coolers of restaurants or food service facilities, including institutions, schools, military facilities, etc., providing enhanced use of space depending on egg storage needs. In one associated business model the telescoping egg container of the present invention is made of a disposable material such as a rigid water-resistant paper-based material (e.g., a molded fiber board material, a wax-coated high-lignin paperboard, a stiff paperboard with wet strength agent added, a paper laminate, cardboard, etc.). The disposable telescoping egg container can be used in shipping or transporting eggs to an end user, who can progressively collapse sections of the egg container as they are no longer needed for eggs that are used. Alternatively, sections of a disposable telescoping egg container can also be simply detached and discarded when they are no longer needed. The telescoping egg container may be used multiple times before discarding, permitting one or more full or partial refills of the egg retention members that hold the eggs in place.

In one version, eggs sold in a retail outlet, through a food service vendor, via a vending machine, or by any other distribution channel are provided to the user pre-packaged in a telescoping egg container of the present invention. The telescoping egg container and the eggs may be further shielded from contamination by the presence of a support tray and plastic wrap, by a disposable box or cover, or placed in a durable box or other container.

In another version, a user can purchase or receive at no cost a telescoping egg container that can be used to receive a desired number of eggs, such as the maximum number of eggs that the telescoping egg container can receive or a less number, as desired, and then transport the selected eggs in the telescoping egg container to another location where the eggs may be used. In one version, a selected number of eggs purchased through a vending machine or other automated means are automatically or manually loaded into a telescoping egg container that is either fully extended or extended to provide a suitable number of available egg retention members to receive the selected number of eggs. The purchaser then receives the eggs in the telescoping egg container. Automatic egg handling technology is well known and includes robotic suction cups, rubber grabbers, and a variety of automated tools for moving an egg from an egg storage region into a container, wherein the system can now be adapted to use a telescoping egg container of the present invention instead of prior containers having a fixed volume.

In either durable or disposable forms, telescoping egg container may be provided as an incentive for the purchase of eggs or other objects that may fit therein. The telescoping egg container may also be customized with decals, printing, colors, various indicia, attached coupons, and the like to serve as a promotional item or to otherwise motivate use and enhance the customer experience.

The egg container of the present invention need not be used solely for eggs, but can be used for a variety of perishable or non-perishable goods of suitable dimensions and shapes. The shape of other goods need not be oval in cross-section or highly rounded, but can be any suitable shape. Thus, chocolates, collectibles, medals, and the like could be stored in the telescoping egg container of the present invention, in spite of its general suitability for eggs.

Motion Guides

The interaction of two nested egg holder units can be governed by motion guides that can guide the motion of one unit relative to another or prevent separation of one unit from another. In several embodiments of the present invention, the motion guides also serve as restraining means to prevent detachment of adjacent egg holder unit. The motion guides can include cooperating ridges and grooves, as well as various protrusions on one or more surfaces of a first egg holder unit that can engage a portion of a second adjacent egg holder unit to limit the scope of motion of the two. Motion guiding means, for example, can include an inner horizontal groove on the inner surface of one or more walls of a first egg holder unit, adapted to receive an outer horizontal ridge on one or more outer surfaces of a second egg holder unit that has at least one smaller dimension that the first egg holder unit, such that the second egg holder unit can be nested inside the first egg holder unit. The interaction of the horizontal groove and ridge in the two units can guide motion during extension or collapse of the telescoping egg container along the primary axis of motion that is in the same direction defined by the horizontal orientation of the groove and ridge. As previously described with respect to restraining means, the interaction of the groove and ridge in this case may act to limit vertical motion of one egg holder unit relative to the other, such that egg holder units retain their integrity in the vertical direction and do not separate when one egg holder unit is lifted.

Alternatively or in addition, to facilitate nesting and optionally to assist in guiding motion of adjacent egg holder units, the side walls of one or more egg holder units may each comprise shoulder elements to maintain suitable vertical spacing relative to adjacent respective egg holder units. The shoulder elements can be ridges descending from the underside of the upper surface long the interior portions of the side walls, for example, such that a lower surface of the shoulder elements can rest on or, in motion, slide on the upper surface of an adjacent forward egg holder unit. Thus, the motion guides can also regulate the vertical spacing of the respective egg holder units in rest and during motion, and thereby facilitate easy nesting when the egg holder unit is collapsed.

Telescoping Components

Telescoping components are known in the art and many versions thereof can be adapted for the present invention. Telescoping components in the art typically have a means to stop the motion of one component relative to a neighboring component when fully extended. The means for stopping the motion can include cooperating protrusions that function as a catch, such as an elevated lip on an outward facing surface of a first component that catches a lip on an inward facing surface of a second component, wherein the first component can nest within the second component. In a related variation, the components may be tapered, either uniformly (e.g., with sides that are substantially linear) or nonuniformly (e.g., with a flared rear region). In such cases, particularly when the components are gradually tapered, the stopping of one segment relative to another may be less sudden than in the catching of elevated lips, and may comprise friction between the two surfaces as one unit is pulled away from the other, causing the larger rear of a first component to frictionally engage the narrower front end of the second component.

Any other known arrangement for restraining telescoping components can be adapted in the present invention. Instructive examples of telescoping units are disclosed in U.S. Pat. No. 7,331,077, "Motorized Telescopic Cleaner," issued Feb. 19, 2008 to M. Henry; U.S. Pat. No. 3,407,424, "Adjustable, Extensible, Telescopic and Collapsible Handle for Attachment to Household Cleaning Devices," issued Oct. 29, 1968 to O. R. Lanzarone and R. L. Lanzarone; U.S. Pat. No. 6,213,672, "Telescoping Pole & Cleaning Tool," issued Apr. 10, 2001 to G. Varga, which describes a guide slot on an outer tube in a telescoping self-aligning tube; and U.S. Pat. No. 5,360,111, Compact Lotion Applicator," issued Nov. 1, 1994 to S. E. Arispe, which describes a telescoping handle in which the motion of one segment relative to another is stopped in the extended state by friction between the segments. See also U.S. Pat. No. 3,842,563, "Extensible Scaffold," issued Nov. 14, 1972 to K. Rasmussen.

DETAILED DESCRIPTION

Figure 1:
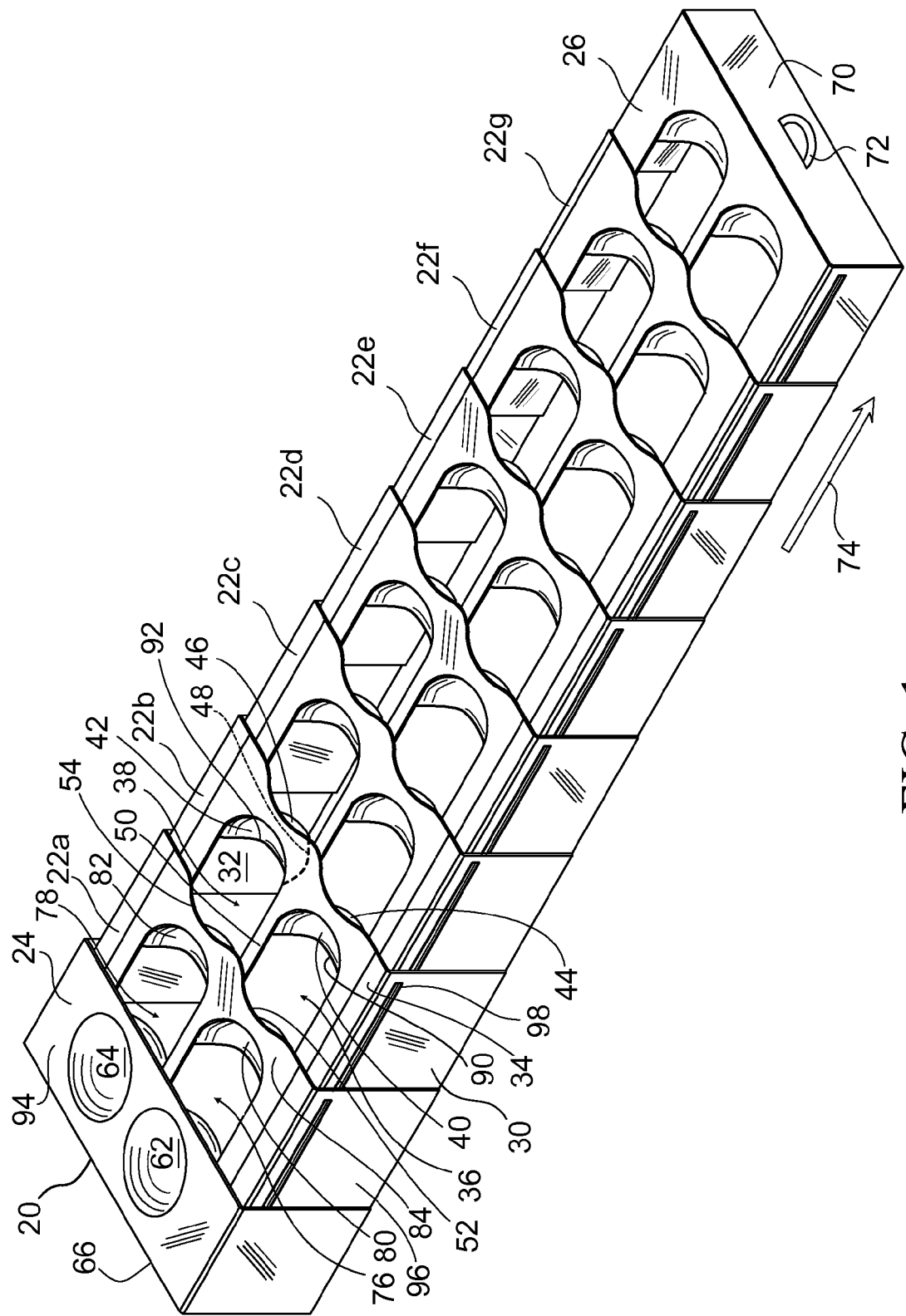
FIG. 1 depicts one embodiment of a telescoping egg container in an extended state.

FIG. 1 depicts one embodiment of a telescoping egg container 20 according to the present invention. The telescoping egg container 20, shown here in a substantially extended state, comprises a plurality of nested egg holder units 22a-22g, 24, 26, including a rear egg holder unit 24 and one or more additional egg holder units 22a-22g, 26. In the embodiment shown, seven intermediate egg holder units 22a-22g are positioned between the rear egg holder unit 24 and the front egg holder unit 26. The front egg holder unit 26 differs in this embodiment from the intermediate egg holder units in that it has a front wall 70 and a tab 72 for convenient pulling or pushing of the telescoping egg container along the axis of extension (indicated by the arrow 74) to extend or collapse the telescoping egg container 20.

The rear egg holder unit 24 may be further provided with stabilizing elements (not shown) such as rubber trim or rubber feet to prevent slippage in use.

Turning to the intermediate egg holder unit 22b as characteristic of the intermediate egg holder units 22a-22g, intermediate egg holder unit 22b comprises a first side wall 30, a second side wall 32 (labeled on the inner surface thereof), an upper surface 34, a first open recessed region 36, a second open recessed region 38, and a divider 50 on the upper surface 34 dividing the first open recessed region 36 from the second open recessed region 38. The first and second open recessed regions, 36 and 38, each have an egg retention member, 40 and 42, respectively, attached to and descending from the upper surface 34 of the intermediate egg holder unit 22b, wherein the egg retention members 40, 42 have a concave form generally adapted to receive an egg. Portions of the rear surfaces 44 and 46 of the egg retention members 40 and 42, respectively, are visible. The obscured lower surface 48 of the egg retention member 42 in the second open recessed region 38 is indicated with a dashed line where it is covered by the upper surface 34 in the view of FIG. 1. In this view, the open recessed regions 36, 38 provide line of site to a supporting surface (not shown) such as a refrigerator shelf, apart from the visible portions of the egg retention members 40, 42 of egg holder unit 22b and the portions of the rear surfaces 44, 46 of the egg retention members 40, 42 of egg holder unit 22a.

The egg retention members 40, 42 have a rear-facing lateral opening 90 and 92, respectively, allowing the egg retention members 40 and 42 to be nested against the egg retention units 80 and 82, respectively, of the adjacent rearward egg holder unit 22a when the egg container 20 is collapsed. In spite of the lateral openings 90, 92, the egg retention units 40, 42 can retain an egg (not shown) without the egg falling away from the egg retention members 40, 42 due to steric hindrance from the presence of the upper surface 84 of the adjacent rearward egg holder unit 22a, and in particular the concave front indentations 52 and 54 which are adapted to provide a curved support surface that, in cooperative association with the egg retention members 40 and 42, respectively, of the egg holder unit 22b, provides a support system to hold an egg (not shown) and may do so without applying undue pressure to any one part of the egg.

The rear egg holder unit 24 may differ from the intermediate egg holder units 22a-22g, as shown here, in that it may have a rear wall 66. Further, the respective egg retention members 62, 64 of the rear egg holder unit 24 may be substantially enclosed below the upper surface 94 thereof, thus lacking a lateral opening, though lateral openings (not shown) may be present, if desired.

A slot 98 on the side wall 30 of the egg holder unit 22b engages a protruding member (not shown) on the inner side wall 96 of the adjacent posterior egg holder unit 22a.

Any two adjacent egg holder units 24, 22a-22g, 26 in the egg container 20 may have similar combinations of protrusions and slots or any other physical restraint means to prevent pulling the adjacent egg holder units apart from one another when the egg container 20 is being extended along the axis of extension parallel to the arrow 74. Geometric hindrance, physical stops, catches, and other means (not shown) may interconnect the egg holder units 22a-22g, 24, 26 such that they can be collapsed or extended, but not readily separated one from another during normal use as the front egg holder unit 26 is pulled to extend it away from the rear egg holder unit 24.

The egg holder unit 22a also has two open recessed regions 76 and 78, respectively, which can receive eggs (not shown) when the egg container is expended or, when the unit is being collapsed, can nest adjacent to the egg retention members 62 and 64, respectively, of the rear egg holder unit 24.

The side wall 30 on egg holder unit 22b (or the corresponding walls of any other egg holder unit 22a-22g, 24, 26) need not be substantially vertical nor planar, but may be provided with any number of aesthetically pleasing features such as curves, angled members, depressed and elevated regions, texturizing elements, cut outs, and the like (not shown). For example, depression regions (not shown) may serve as thumb tabs or finger holds for convenient grasping when moving or sliding individual egg holder units (22a-22g, 24, 26) relative to one another.

Figure 2:
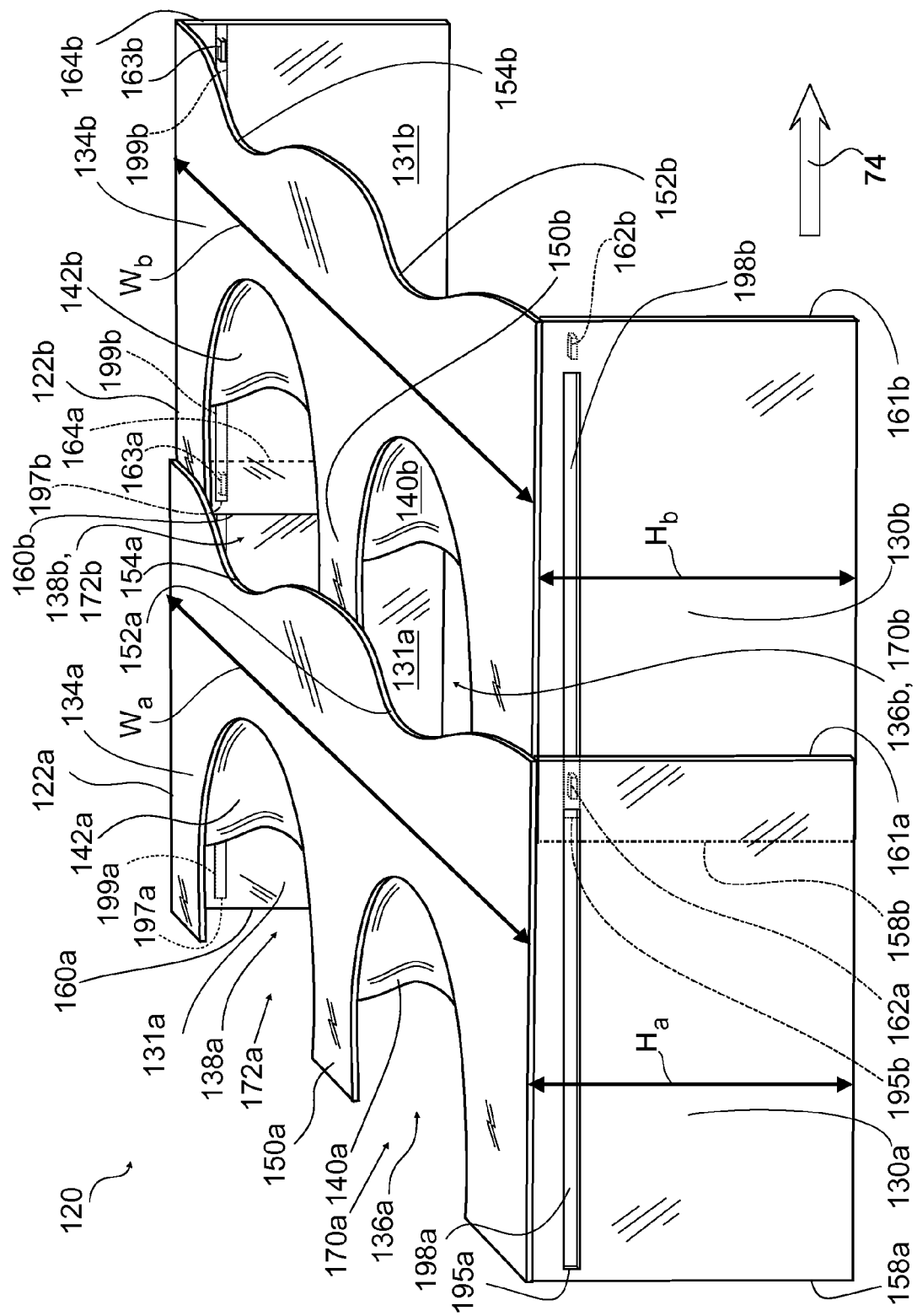
FIG. 2 depicts a portion of a telescoping egg container showing two slidably engaged egg holder units.

FIG. 2 further illustrates details of one aspect of the present invention, showing a section of a telescoping egg container 120 with two nested, slidably engaged egg holder units, 122a and 122b. A first egg holder unit 122a is engaged in a nesting relationship with a second egg holder unit 122b, the first egg holder unit 122a having a width $W_a$ that is slightly greater than the width $W_b$ of the second egg holder unit 122b. Each egg holder unit 122a and 122b comprises, respectively, a first side wall 130a, 130b (the outer surface being visible in FIG. 2) and a second side wall 131a, 131b (the inner surface being visible in FIG. 2), an upper surface 134a, 134b joined to the side walls 130a, 130b, 131a, 131b. The upper surface 134a, 134b has a first recessed region 136a, 136b and second recessed region 138a, 138b, capable of receiving an egg (not shown). Further, a first egg retention member 140a, 140b and a second egg retention member 142a, 142b is present below the first and second recessed regions 136a, 136b, 138a, 138b, having a substantially concave shape (though other shapes may be used, including a boxlike or rectangular structure) and being attached to the upper surface 134a, 134b of the egg holder units 122a, 122b.

A divider 150a, 150b separates the first recessed region 136a, 136b from the second recessed region 138a, 138b, respectively. The side walls 130a, 130b of the egg holder units 122a, 122b, respectively, have a rear wall end 158a, 158b and a forward wall end 161a, 161b. Likewise, the opposing side walls 131a, 131b have a rear wall end 160a, 160b and a forward wall end 164a, 164b. The rear wall ends 158b, 160b of the forward egg holder unit 122b are contained within the forward wall ends 161a, 164a of the rear egg holder unit 122a in a nesting relationship.

Each of the first and second recessed regions 136a, 136,b, 138a, 138b, when viewed from above in a plan view, is not completely enclosed by the material of its respective egg holder unit 122a, 122b alone, but relative to its respective egg holder unit 122a, 122b (i.e., when considered without the presence of any adjacent egg holder units) is open toward the rear of the respective egg holder unit 122a, 122b (the rear being toward the direction opposite the forward direction indicated by the arrow 74 showing the axis of extension), defining a lateral opening 170a, 170b, 172a, 172b on the rear side of each respective egg holder unit 122a, 122b which permits the respective egg retention members 140a, 140b, 142a, 142b to nest within the adjacent egg retention members (142a, 142b, and others not shown) toward the rear when the portion of an egg container 120 is in a collapsed state (not shown). For the section of an egg container 120 shown in an extended state, the egg retention members 140b and 142b of the forward egg holder unit 122b can, when the egg holder units 122a and 122b are pushed together in a more collapsed state (moving egg holder unit 122b toward egg holder unit 122a), receive the egg retention members 140a and 142a, respectively, of the egg holder unit 122a.

Were the individual egg holder unit 122b to be used alone without being in a cooperating relationship with the adjacent egg holder unit 122b, an egg (not shown) placed on an egg retention member 140b or 142b could (but need not) fall away from the egg retention member 140b or 142b toward the rear (away from the direction shown by arrow 74) since it is not enclosed by the material of the egg holder unit 122b but is exposed to the lateral opening 170b or 172b, respectively. But in cooperating relationship with the adjacent egg holder unit 122a engaged with the rear of the egg holder unit 122b, the concave front indentations 152a, 154a in the upper surface 134a of the adjacent rearward egg holder unit 122a provide a support surface to enclose an egg (not shown) resting on the egg retention member 140b or 142b, respectively.

To prevent undesired separation of the egg holder units 122a, 122b, either when the egg container section 120 or a portion thereof is lifted in the vertical direction, or during extension of the egg container section 120, one version of a restraint system is shown in the form of protruding members 162a, 163a, 162b, 163b adapted to engage grooves such as grooves 198a, 198b, 199a, 199b. In FIG. 2, protruding member 163a extends away toward the interior of the egg holder unit 122a from the inner surface of side wall 131a and engages a groove 199b on the outer surface of side wall 131b of egg holder unit 122b. Likewise, an opposing protruding member 162a on the inner surface of side wall 130a of egg holder unit 122a engages a groove 198b on the outer surface of side wall 130b. The interaction of protruding members 162a, 163a with grooves 198b, 199b helps hold the two egg holder units 122a, 122b in place during lifting or extension. The grooves 198a, 198b, 199a, 199b generally do not extend across the full length of their respective side walls 130a, 130b, 131a, 131b to prevent separation of egg holder units 122a, 122b during extension. In particular, the rearward terminal points 195b and 197b of grooves 198b and 199b, respectively, in egg holder unit 122b effectively serve as stops that catch the protruding members 162a, 163 of the adjacent egg holder unit 122a at the point of full extension, preventing further forward motion along the axis of extension defined by arrow 74. The rearward terminal points 195a and 197a of grooves 198a and 199a, respectively, can also serve as catches to hold prevent separation from another adjacent egg holder unit (not shown) to the rear of egg holder unit 122a into which egg holder unit 122a may fit in a nesting relationship. Likewise, a section of additional forward egg holder units (not shown) may engage with egg holder unit 122b in a nesting relationship, with protruding members 162b and 163b on side walls 130b and 131b, respectively, fitting into grooves (not shown) of the posterior egg holder unit (not shown) of the section of additional forward egg holder units (not shown).

The protruding members 162a, 162b, 163a, 163b can be of any suitable dimensions and may be substantially longer or shorter than shown here. Multiple protruding members and multiple grooves (not shown) may be present on one or more side walls of any egg holder unit such as 122a, 122b, as desired. The protruding members 162a, 162b, 163a, 163b may comprise the same material as the side walls 130a, 130b, 131a, 131b or may comprise a different material, and may be formed by injection molding, adhesive attachment, welding, sintering, or any other known means. The shape thereof need not be rectangular but may be, for example, a protruding cylinder, cone, ridge, or any other suitable shape or plurality of shapes. In one version, the protruding members 162a, 162b, 163a, 163b and/or the side walls 130a, 130b, 131a, 131b comprise a rigid material that can deform under forces capable of being applied by the hands without permanent damage to the egg container 120 such that portions of the egg holder unit 122a, for example, can be temporarily deformed sufficiently to allow the protruding members 162a, 163a, to snap into the grooves 198b, 199b, of an adjacent egg holder unit 122b. Similar principles can apply to the assembly and restraint means during use for all pairs of adjacent egg holder units in a complete egg container (not shown) having more than the two egg holder units 122a, 122b of FIG. 2.

The height $H_a$ of the rearward egg holder unit 122a is slightly greater than the height $H_b$ of the forward egg holder unit 122b for more convenient nesting of the forward egg holder unit 122b within the rearward egg holder unit 122a. Alternatively, the height difference may such that a gap of at least about 1 millimeter (mm), 2 mm, 3 mm, or 4 mm (e.g., from 1 mm to 6 mm or from 2 mm to 5 mm) exists between the underside of the upper surface 134a of rearward egg holder unit 122a and the upper surface 124b of the adjacent relatively forward egg holder unit 122b.

Figure 3:
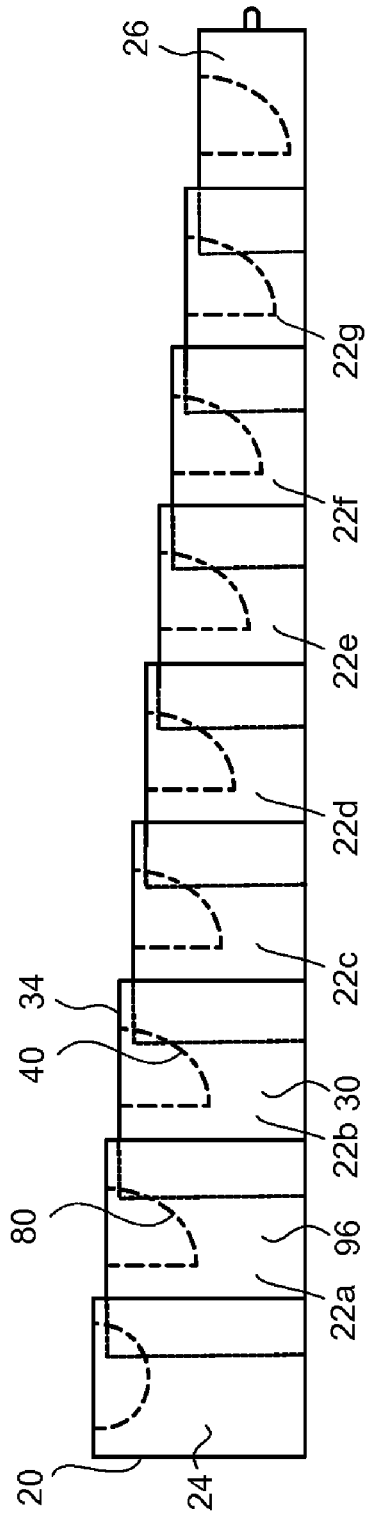
FIG. 3 depicts a side view of a telescoping egg container in an extended state.

FIG. 3 shows a side view of a telescoping egg container 20 similar to that shown in FIG. 1, in an extended state. The rear and front egg holder units 24 and 26, respectively, are shown, with the intermediate egg holder units 22a-22g. For characteristic egg holder unit 22b, a side wall 30 is shown, which nests within the side wall 96 of the adjacent rearward egg holder unit 22a. An egg retention member 40 within egg holder unit 22b is shown which, when the egg container 20 is in collapsed form (not shown), can receive the egg retention member 80 of the adjacent rearward egg holder unit 22a. The egg retention member 40 descends from the upper surface 34. As shown in FIG. 3, the egg retention member 40 of characteristic intermediate egg holder unit 22b has a cross-section in this side view that can be described as approximating a quarter sphere, or one half of a hemispherical shell.

Figure 4:
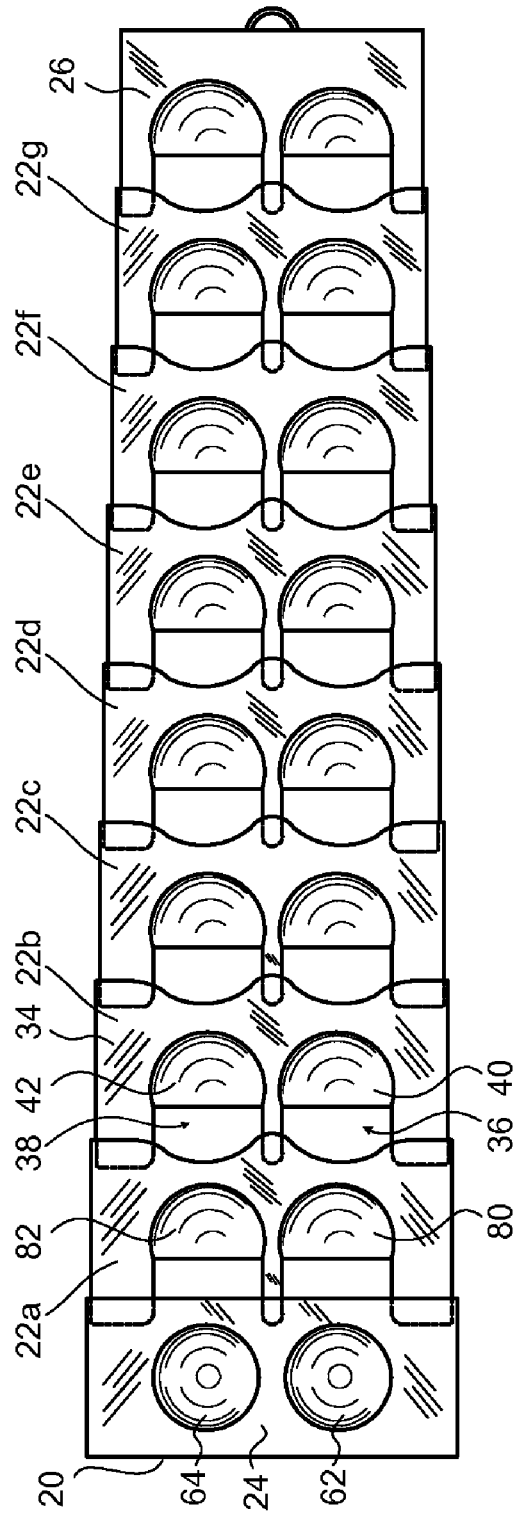
FIG. 4 depicts a plan view of a telescoping egg container in an extended state.

FIG. 4 shows the top view of the telescoping egg container 20 of FIG. 3, similar to that of FIG. 1. In characteristic intermediate egg holder unit 22b, the descending egg retention members 40 and 42 are visible in the first and second recessed regions 36 and 38, respectively.

The footprint or the plan view projected surface area of the open recessed region 38, 40 within the egg holder unit 22b is only partially occupied by the solid matter of the egg retention member 40, 42, with a portion of the open recessed regions 38, 40 being open when viewed from above to provide line of sight to any underlying support surface (not shown).

Figure 5:
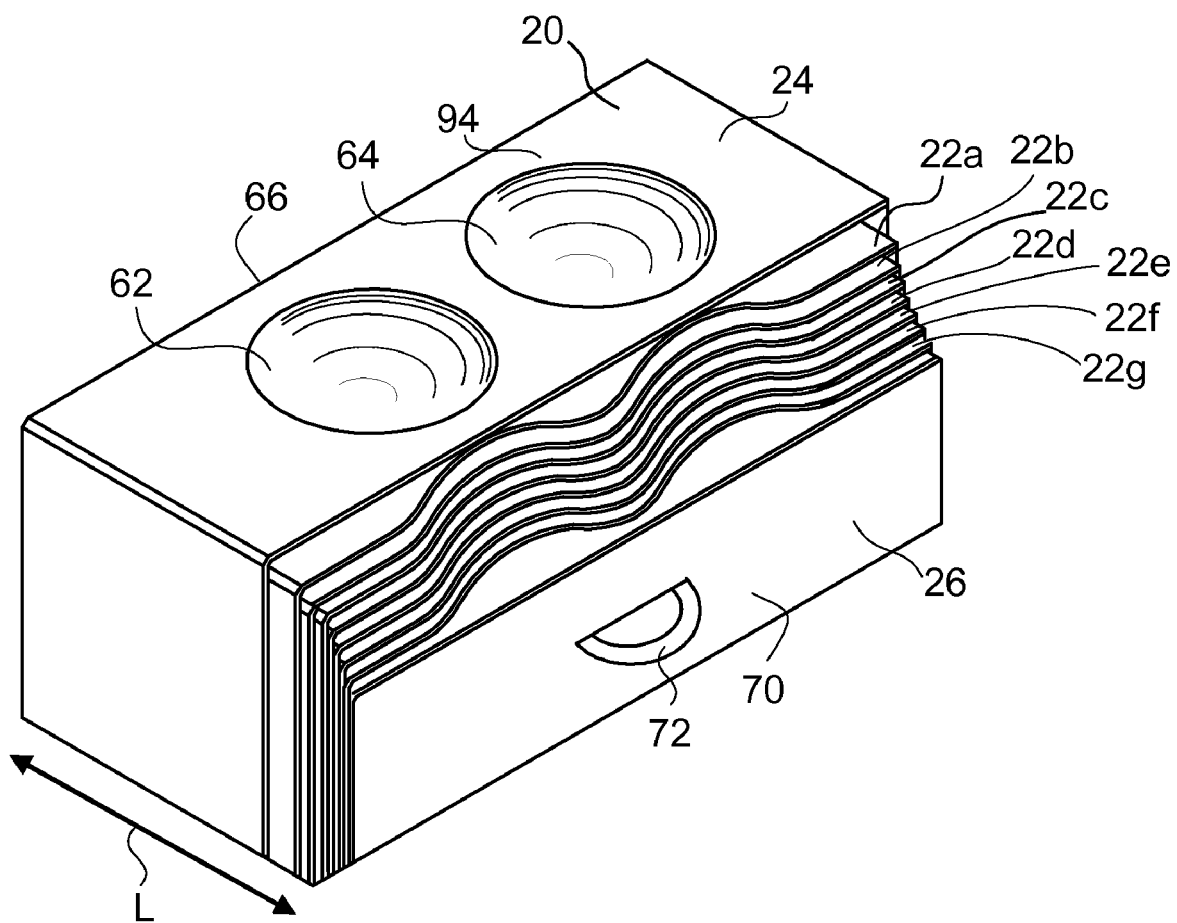
FIG. 5 depicts a telescoping egg container in a substantially collapsed state.

FIG. 5 shows a related egg container 20 in a substantially collapsed state, wherein each of the intermediate egg holder units 22a-22g and the front egg holder unit 26 nest within an adjacent rearward egg holder unit 24, 22a-22g respectively. The egg container has a collapsed length L substantially less than the length of the egg container 20 in its fully extended state. The ratio of the extended length to the collapsed length can be, for example, approximately equal to or great than any of the following values or any intermediate value: 2, 3, 4, 5, 7, 10, 12, such as from about 3 to about 15, or from about 2 to about 12, or more specifically from about 3 to about 10.

Figure 6:
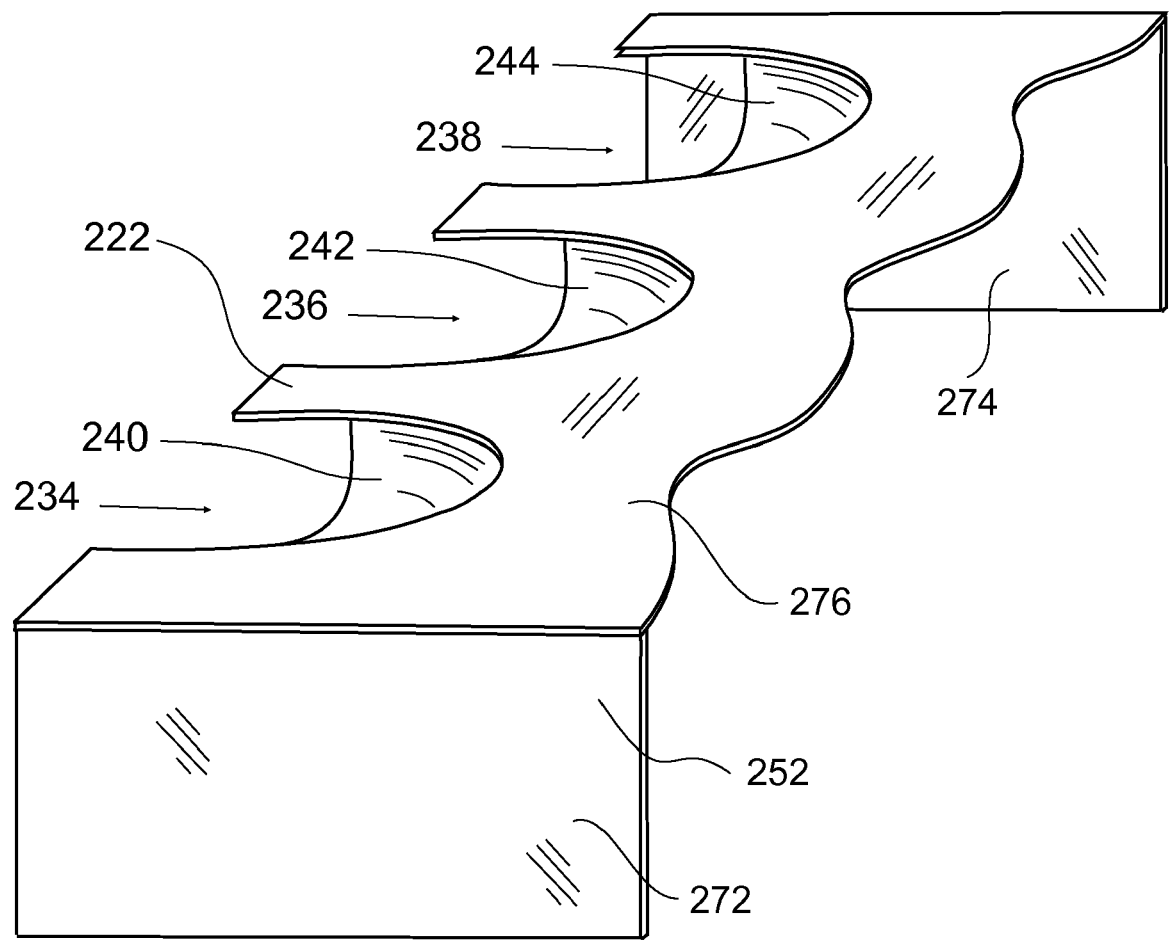
FIG. 6 depicts a single egg holder unit having three egg retention members, with one in each of three open recessed regions, respectively.

FIG. 6 shows an example of an egg holder unit 222 adapted to hold up to three eggs. The egg holder unit 222 has a frame 252 comprising a substantially horizontal upper surface 276 and side walls 272, 274. There are three upper openings 234, 236, and 238 each with an egg retention member 240, 242, and 244, respectively. The egg holder unit 222 may engage with other adjacent egg holder units (not shown) also adapted for holding up to three eggs, or a greater or smaller number of eggs, provided that the dimensions of the adjacent egg holder units (not shown) and the locations of other egg retention members (not shown) are suitable for nesting with respect to the egg holder unit 222 such that the associated egg container (not shown) has telescoping functionality.

Figure 7:
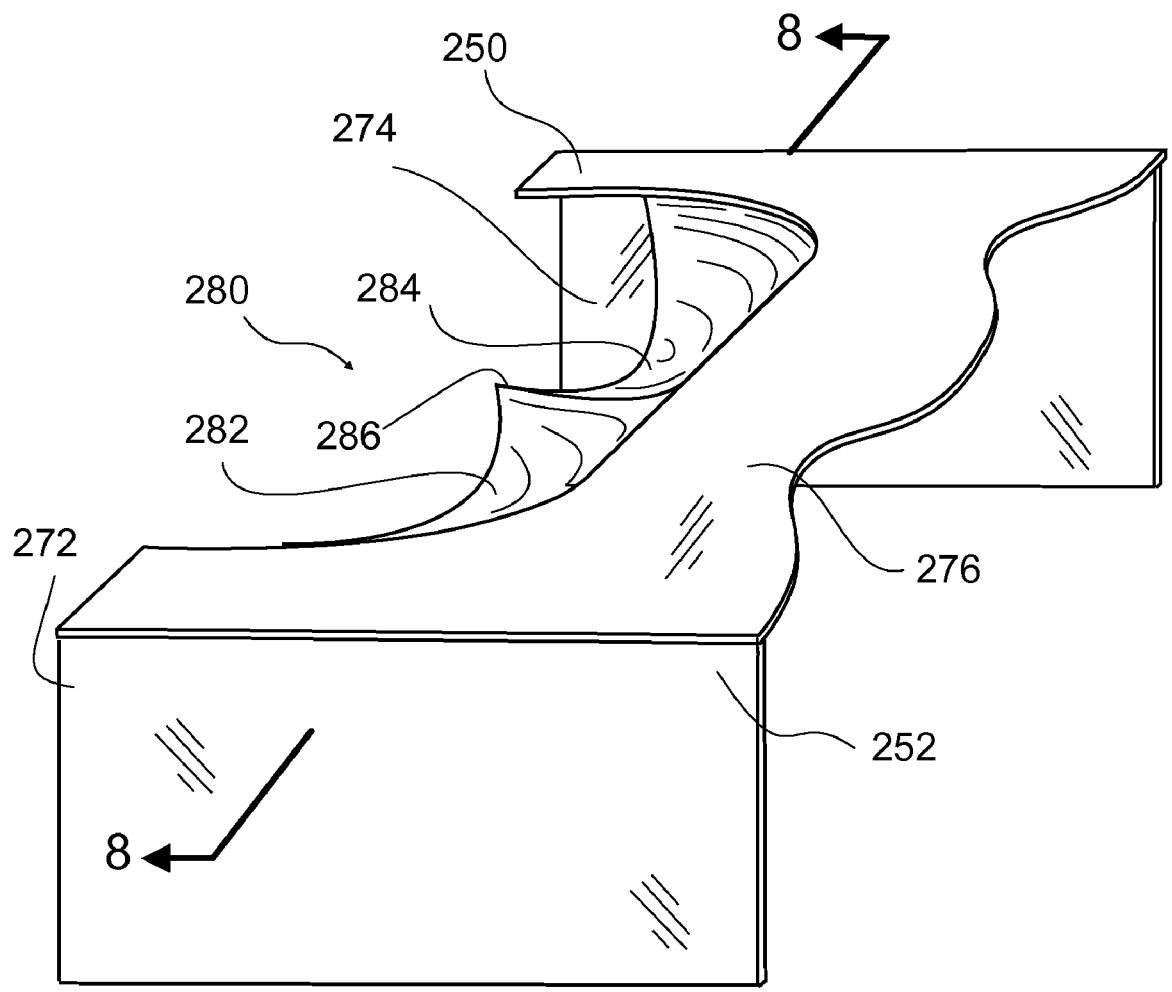
FIG. 7 depicts a single egg holder unit having one open recessed region with two interconnected egg retention members therein.

FIG. 7 is another version of an egg holder unit 250 for use in egg containers (not shown) according to some embodiments of the present invention. The egg holder unit 250 has a frame 252 comprising a substantially horizontal upper surface 276 and side walls 272, 274. Note that the side walls 272, 274 are merely one example of various support structures which hold the horizontal upper surface 276 at a predetermined position relative to an underlying support structure (not shown) such as a refrigerator shelf on which the frame 252 may rest. Were the frame to be supported from above, as when an egg container (not shown) were suspended from an top surface in a refrigerator, the side walls might alternatively descend from a superior support surface (not shown).

In this version, there is a single open recessed region 280 adapted for receiving up to two eggs, for it comprises a first egg retention member 282 and a second egg retention member 284 joined together with a divider 284 therebetween that is simply a ridge between the two egg retention members 282, 284, completely below the elevation of the horizontal upper surface 276.

Figure 8:
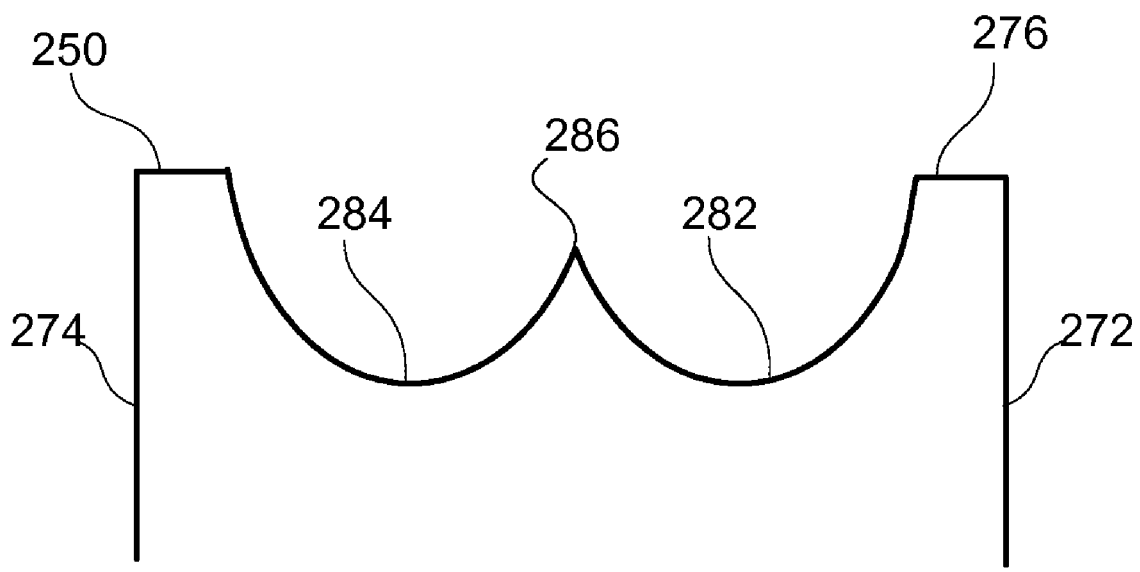
FIG. 8 depicts a cross-section taken from a slice of FIG. 7.

FIG. 8 shows a cross-section taken through a plane normal to the horizontal surface 276 of FIG. 7 and passing across the width of the two egg retention members 282, 284 of FIG. 7. The shape of the two egg retention members 282, 284 below the horizontal surface can be seen, showing that two eggs could be received in this egg holder unit 250. The egg holder unit 250 could be modified to include any number of eggs, such as one, three, four or more, and so forth.

Figure 9:
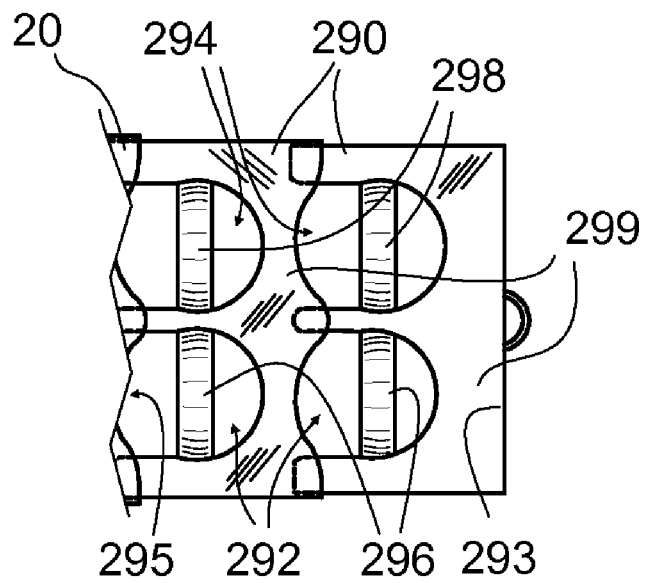
FIG. 9 shows a front section of a telescoping egg container showing two forward egg holder units with egg retention members that are open both toward the front and the rear of the telescoping egg container.

FIG. 9 depicts a portion of a telescoping egg container 20 similar to the forward end (right-hand side) of FIG. 3, but showing an alternate version. The telescoping egg container 20 comprises a plurality of nesting egg holder units 290 each with an upper surface 299. Each egg holder unit 290 has a first open recessed region 292 and a second open recessed region 294, each of which has a concave egg retention member 296, 298, respectively. The concave egg retention members 296, 298 are attached to and descend from the upper surface 299 of each egg holder unit 290 and resemble a curved band that is laterally open both toward the front face 293 and the rear 295 of the displayed section of telescoping egg container 20. Any other suitable configuration for the egg retention members 296, 298 may be employed, with a wide variety of openings, curved contours, and decorative elements (not shown) being possible within the scope of the present invention.

Figure 10:
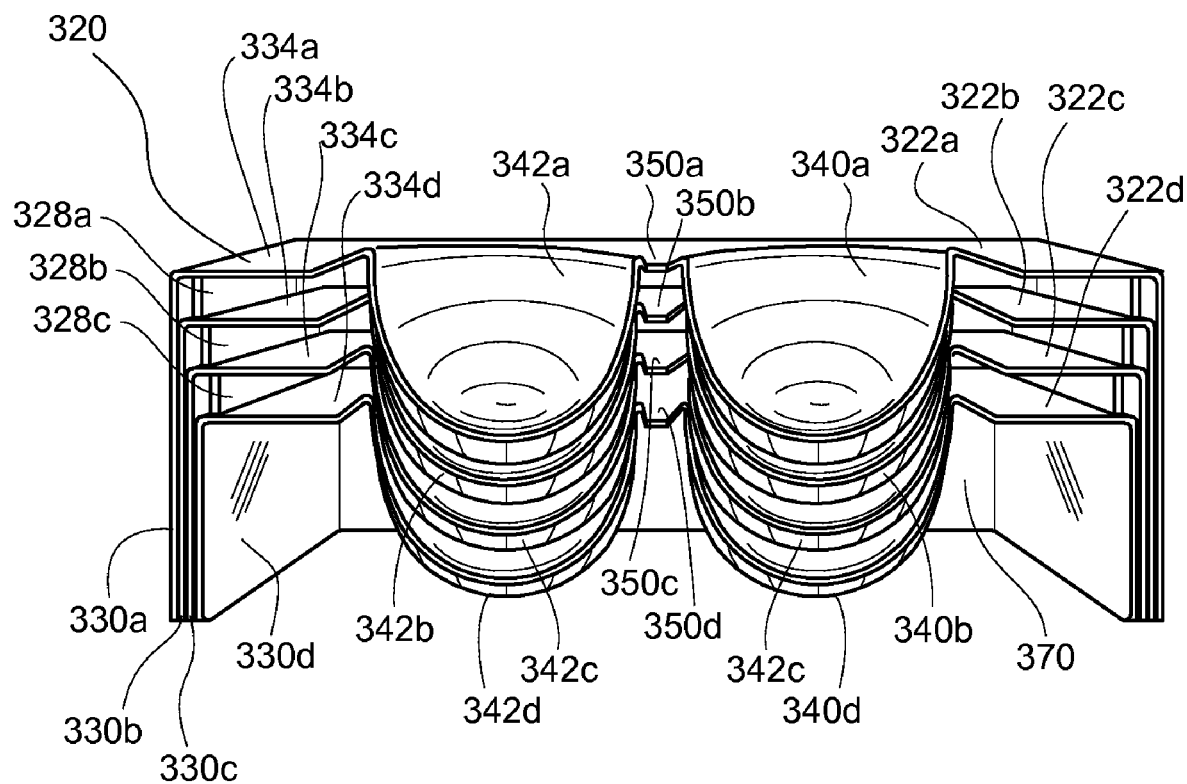
FIG. 10 depicts a rear view of four forward egg holder units in a portion of an egg container according to the present invention.

FIG. 10 depicts a portion of a telescoping egg container 320 viewed from the rear. The portion 320 shown has four forward egg holder units 322a, 322b, 322c, and 322d, which, referring momentarily to FIG. 1, are similar to the four most forward egg holder units 22e, 22f, 22g, and 26 therein. Each egg holder unit 322a, 322b, 322c, and 322d comprises an upper surface 334a, 334b, 334c, and 334d, respectively, outer walls 330a, 330b, 330c, and 330d, respectively, a first egg retention member 340a, 340b, 340c, and 340d, and a second egg retention member 342a, 342b, 342c, and 342d, respectively, with dividers 350a, 350b, 350c, and 350d therebetween. The most forward egg holder unit 322d also comprises a forward wall 370, though it may be replaced with an opening (not shown) or other features in other embodiments.

Also shown are internal shoulders 328a, 328b, 328c on both of the opposing side walls 330a, 330b, 330c, respectively, in the near the juncture of the side walls 330a, 330b, 330c and the upper surface 334a, 334b, and 334c of the three uppermost (rearward) egg holder units 322a, 322b, and 322c, respectively, which serve as spacers and sliding surfaces, allowing an upper egg holder unit 322a, 322b, 322c to rest on and, in motion, slide on, the adjacent underlying egg holder unit 322b, 322c, 322d, respectively. The spacing provided by the internal shoulders 328a, 328b, 328c can also assist in proper nesting of the holder units 322a, 322b, 322c, and 322d, particularly the first egg retention members 340a, 340b, 340c, and 340d and the second egg retention member 342a, 342b, 342c, and 342d.

All four egg holder units 322a, 322b, 322c, and 322d are shown nested together in a substantially collapsed state.

Remarks

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above compositions, products, and methods without departing from the scope of aspects of the invention, it is intended that all matter contained in the above description shall be interpreted as illustrative and not in a limiting sense.

While the foregoing description makes reference to particular illustrative embodiments, these examples should not be construed as limitations. The inventive system, methods, and devices can be adapted for many other uses not explicitly listed above, and can be modified in numerous ways within the spirit of the present disclosure. All elements shown, for example, may be subject to a wide variety of decorative enhancements and variations in shape, texture, and so forth without departing from the scope of the present invention.

Thus, the present invention is not limited to the disclosed embodiments, but is to be accorded the widest scope consistent with the claims below.

I claim:

1. A telescoping egg container comprising a plurality of egg holder units, the plurality of egg holder units having at least a front egg holder unit and a rear egg holder unit, wherein the egg holder units each comprise a frame having an upper surface and side walls, at least one open recessed region in the upper surface, and at least one egg retention member within the at least one open recessed region being adapted to assist in holding an egg in place in the egg container, each egg retention member being attached to the frame, wherein the plurality of egg holder units can be nested together such that they can be collapsed or extended as the front egg holder unit is pulled to extend it away from the rear egg holder unit, wherein the telescoping egg container in the extended state is capable of holding a larger number of eggs than in the collapsed state; wherein the frame further comprises two substantially vertical side walls having a height, and wherein the height of the side walls of each egg holder unit differs from the height of the side walls of any adjacent egg holder unit, with the rear egg holder unit having the greatest height, such that when the telescoping egg container is resting on a flat supporting surface, each side wall of each egg holder unit can maintain contact with the flat supporting surface both in the extended state and in the collapsed state.

2. The telescoping egg container of claim 1, wherein the side walls of one or more egg holder units each comprise shoulder elements to maintain suitable vertical spacing relative to adjacent respective egg holder units.

3. The telescoping egg container of claim 1, wherein a first plurality of the egg holder units have side walls that comprise grooves substantially parallel to the axis of extension, and a second plurality of the side walls comprise protruding elements adapted to engage the grooves of respective adjacent egg holder units.

4. A telescoping egg container capable of being positioned in an extended state or in a collapsed state, comprising a rear egg holder unit, a forward egg holder unit, and one or more intermediate egg holder units, each egg holder unit comprising a frame having at least one recessed region with at least one egg retention member for receiving an egg when the telescoping egg container is in the extended state, the egg retention members of the one or more intermediate egg holder units and the forward egg holder unit having a rear-facing lateral opening to facilitate nesting of the egg holder units with each other when the telescoping egg container is in the collapsed state, wherein each of the rear egg holder unit and the one or more intermediate egg holder units has a forward portion that, when the telescoping egg container is in the extended state, cooperates with at least one of the egg retention members of an adjacent egg holder unit such that an egg can be retained in the at least one of the egg retention members without risk of falling through the lateral opening.

5. The telescoping egg container of claim 4, wherein the egg holder units are slidably connected one to another by a mechanical restraining system.

6. The telescoping egg container of claim 4, wherein each egg holder unit comprises at least two egg retention members, wherein the total number of egg holder units is at least six.

7. The telescoping egg container of claim 4, wherein at least one of the egg holder units comprises three or more egg retention members.

8. The telescoping egg container of claim 4, wherein each egg holder unit comprises two substantially vertical side walls having a height, and wherein the height of the side walls of each egg holder unit differs from the height of the side walls of any adjacent egg holder unit, with the rear egg holder unit having the greatest height, such that when the telescoping egg container is resting on a flat supporting surface, each side wall of each egg holder unit can maintain contact with the flat supporting surface both in the extended state and in the collapsed state.

9. The telescoping egg container of claim 4, wherein each egg retention member has a curved concave shape adapted to the contours of a chicken egg.

\* \* \* \* \*